DATA STORAGE SYSTEM

Filed Sept. 2, 1960 2 Sheets-Sheet 1

INVENTOR
JOHN C. F. WALKER III

BY Louis A Kline
J. Lavender
HIS ATTORNEYS

Aug. 25, 1964 J. C. F. WALKER III 3,146,428

DATA STORAGE SYSTEM

Filed Sept. 2, 1960 2 Sheets-Sheet 2

INVENTOR
JOHN C. F. WALKER III

BY Louis A. Kline
J. Cavender
HIS ATTORNEYS

3,146,428
DATA STORAGE SYSTEM

John C. F. Walker III, Dayton, Ohio, assignor to The National Cash Register Company, Dayton, Ohio, a corporation of Maryland Filed Sept. 2, 1960, Ser. No. 53,834
5 Claims. (Cl. 340—174)

Figure 1:
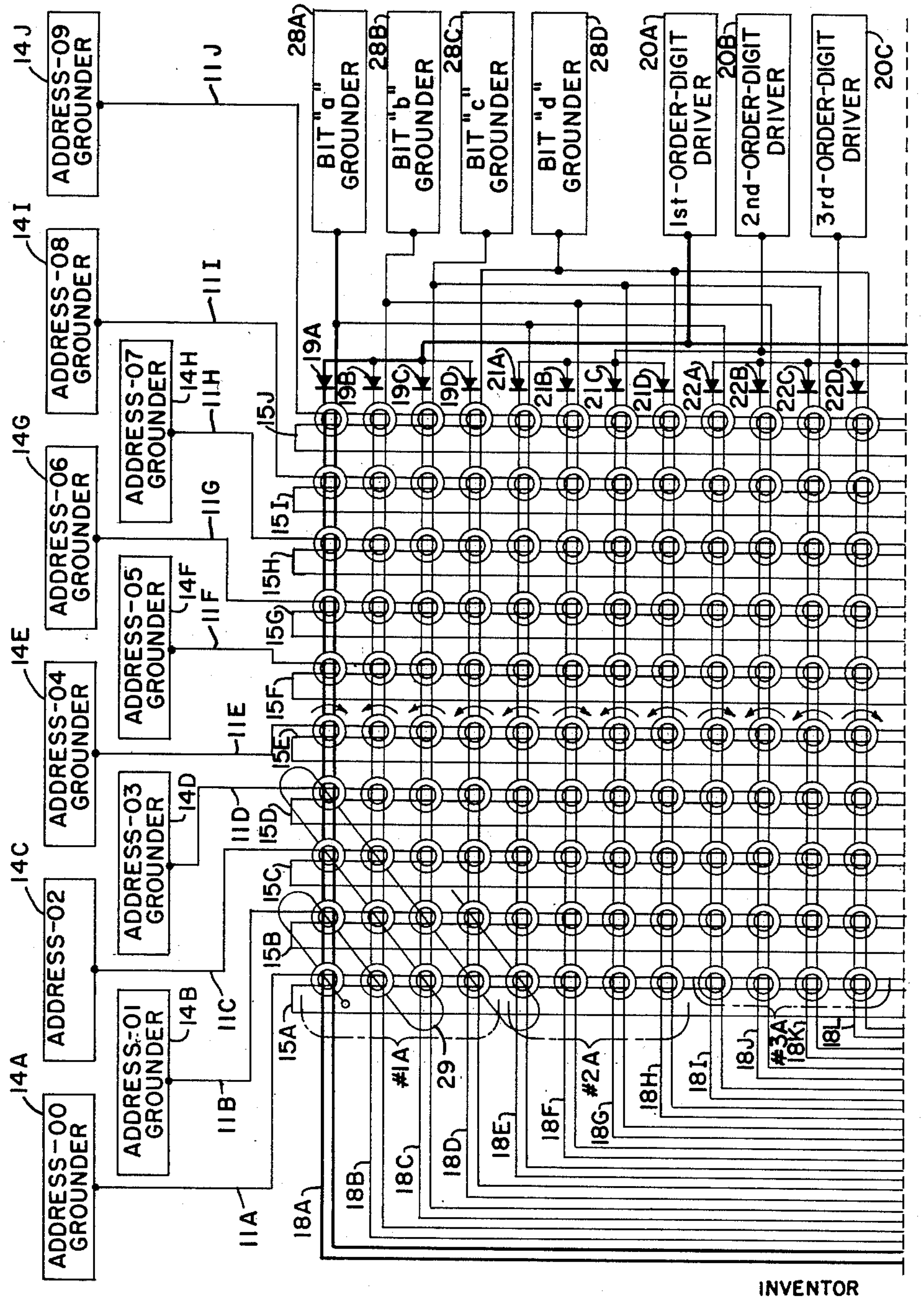

The present invention relates generally to static types of data storage systems, and, more particularly, relates to a novel biplanar type of coincident current memory system.

Information-handling machines, computing equipment, and the like usually utilize some type of data storage system as a part of the operating structure thereof, the particular type utilized being dependent upon the particular design of the machine. As is well known to those skilled in the design of static, random-access types of magnetic memories, information in the form of a binary digit (commonly referred to as a "bit") is represented by the direction or polarity of remanent saturation of the magnetic element utilized for information storage. Such a magnetic element may be composed of any suitable magnetic material and may have a physical configuration in the form of a rod, core, toroidal ring, thin film, apertured plate, or other suitable shape. In most instances, storage of bits of information is effected by utilizing toroidal-shaped cores of magnetic material having a substantially rectangular hysteresis loop characteristic. One direction of magnetization, or polarity of remanent saturation, is commonly referred to as the positive direction, whereas the remaining direction of magnetization, or opposite polarity of remanent saturation, is usually referred to as the negative direction. The positive direction of magnetization may arbitrarily be chosen to be indicative of the binary digit "1" and the negative direction of magnetization indicative of the binary digit "0," or vice versa. A two-dimensional array, or "plane," of such cores is normally utilized in a manner whereby the cores are arranged in an orderly geometric pattern of vertical columns and horizontal rows. For each row of cores, there is provided a row coil which is normally coupled in the same sense to all the cores of the row, and, for each column of cores, there is provided a column coil which is normally coupled in the same sense to all the cores of the column. "In the same sense" means that a current flowing in a row or column coil causes a flux to flow in the same direction in each of the cores located in the corresponding row or column. In some instances, a reading coil (commonly referred to as a "sense winding") is provided which is coupled to every core in the plane, if they are to be read singly. However, in other instances, a plurality of reading coils is provided, each of which is coupled to a particular group of cores, wherein one core in each group is "read" during each readout operation.

When a current is simultaneously applied to both a row coil and a column coil, only that particular core which is inductively coupled to both coils is driven to saturation, the direction of saturation to which the core is driven being determined by the direction of current flow through the two excited row and column coils. The current applied to each coil is normally less than that required to cause saturation of all the cores coupled to the excited coil, but is of sufficient magnitude that the particular core coupled to both an excited row and column coil is driven to saturation, assuming, of course, that the two magnetomotive forces produced by the two currents are additive in the region of the core. A readout operation is performed by applying a saturating magnetomotive force in a given direction to a selected core. If the core is already saturated in the same direction in which the driving magnetomotive force is directed, substantially no flux change is effected in the core, and, therefore, substantially no voltage is induced in the reading coil. However, if the core is not saturated in the same direction as the driving magnetomotive force, the polarity of remanent saturation is caused to be reversed. As a result, a substantial flux change takes place within the core, which flux change causes a voltage impulse to be induced in the reading coil coupled thereto. Thus, the presence or absence of a voltage impulse across the output terminals of the reading coil is indicative of the previous magnetic condition of the core being read. Since, in the "interrogation" of a core, the information initially stored therein is usually destroyed, provision is normally made to restore the core to the opposite saturation polarity whenever an impulse is detected in the reading coil during reading of that particular core.

When it is desired to expand the storage capacity of a memory system by, say, doubling the number of address locations (i.e., the number of columns), it is at times highly advantageous from an economical standpoint, and also for simplicity of design of the accompanying logical drive-selection circuitry, to provide two identical planes of storage elements, each plane containing one half the total number of required storage locations, rather than to provide a single memory plane containing twice the number of storage locations. In such a biplanar type of memory system, it has generally been the practice to provide each memory plane with an additional "inhibit" winding which is coupled to all the storage elements of that particular plane. Thus, when a reading or writing operation is initiated with respect to one memory plane, the inhibit winding of the remaining plane is immediately energized and thereby causes the storage elements of the remaining plane to be unaffected during the read-write operation.

However, it has been found that, due to the fact that it is necessary to inhibit operation of one memory plane at precisely the same time a read-write operation is initiated with respect to the other memory plane, stringent timing requirements are necessarily placed on the logical circuitry utilized to control operation of the memory. As a result, such a memory system has been found to be continually plagued with malfunction.

Therefore, the primary object of the present invention is to devise a new and improved biplanar memory system which automatically inhibits operation of one memory plane when a read-write operation is initiated with respect to the remaining memory plane.

Another object of the present invention is to devise such a biplanar memory system which does not necessitate any type of inhibit control or stringent timing requirements with respect to the accompanying drive-selection circuitry.

Still another object of the present invention is to devise such a biplanar memory system which may be economically fabricated, is not susceptible to continual malfunction, and is capable of utilizing any of the various storage elements taken from the group including ferroelectrics, magnetic thin films, apertured plates, rods, toroidal cores, twistors, bit wires, and the like.

In accordance with the present invention, there has been provided a new and improved biplanar memory system which comprises a first and a second group of storage elements, each group of elements being arranged in a plurality of columns and rows, with each element having two stable states and a response-excitation characteristic of a substantially rectangular hysteresis loop type. Such a memory system further includes a plurality of energizing means, a different one of which is coupled to all the storage elements in a different one of corresponding columns of both the first and the second groups, and is operative to partially effect a change of state in one direction of the columnar elements associated therewith; and further included is a plurality of reversibly operable energizing means, a different one of which is coupled to all the storage elements in a different one of the rows of the first group and operative in one direction to effect a partial change of state in one direction of the row elements of the first group associated therewith, and is additionally oppositely coupled to all the storage elements in a corresponding one of the rows of the second group and operative in the mentioned one direction to effect a partial change of state in the opposite direction of the row elements of the second group associated therewith.

The features of the present invention which are believed to be novel are set forth with particularity in the appended claims. The organization and manner of operation of the invention, together with further objects and advantages thereof, may best be understood and appreciated by reference to the following description taken in connection with the accompanying drawings, in which like reference numerals identify like elements.

Figure 2:
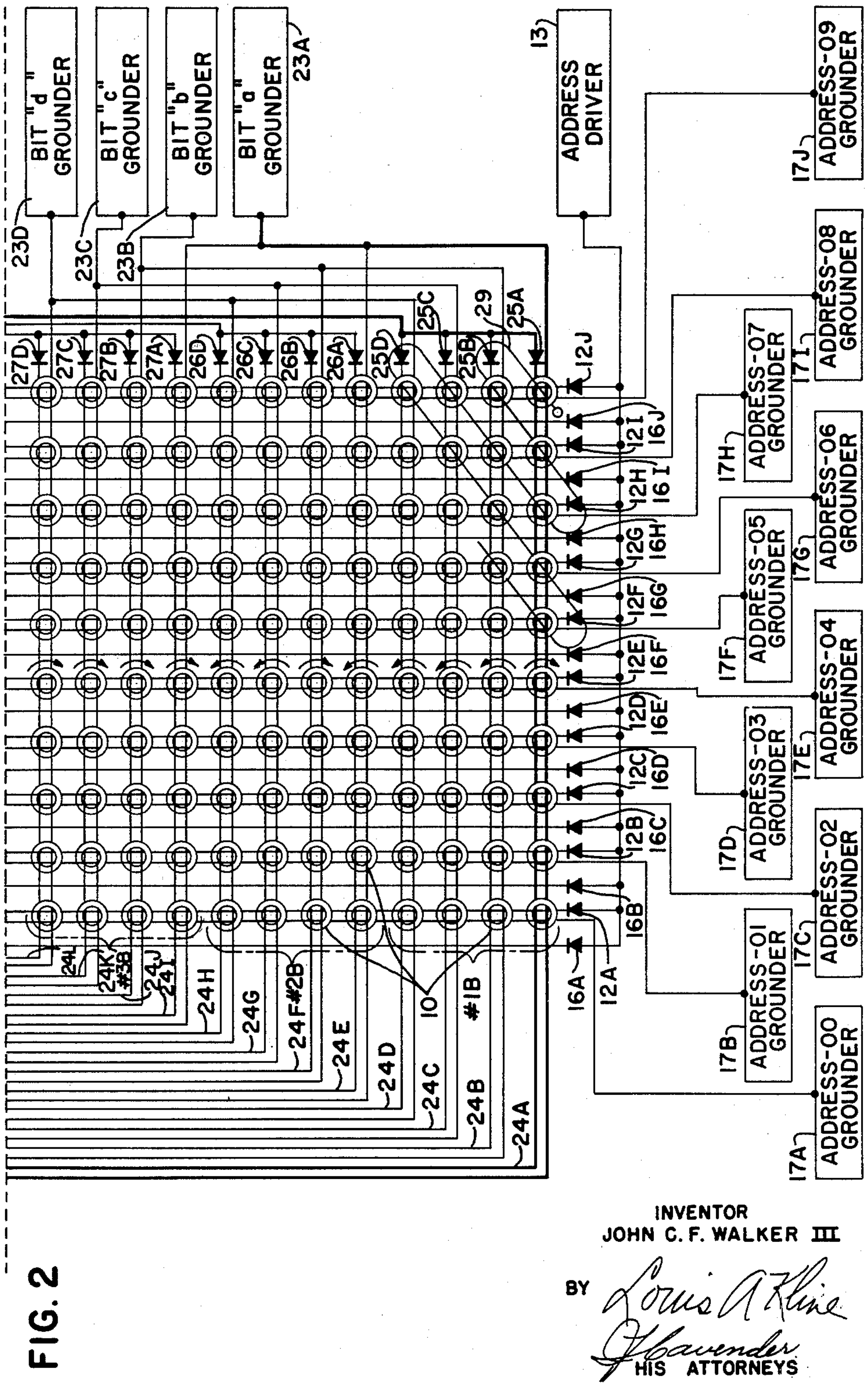

FIGS. 1 and 2, when connected together in the manner indicated by the dotted lines, consitute a schematic diagram illustrating a novel biplanar memory system constructed in accordance with a preferred embodiment of the present invention. In FIG. 1, there is illustrated a first memory plane which comprises an array of magnetic data-storage elements in the form of toroidal cores 10, which are arranged in an orderly geometric pattern of ten vertical columns and twelve horizontal rows. It is to be noted at the outset, however, that the particular number of columns, hereinafter termed "addresses," and the particular number of cores in each address are not critical; the particular number of each is herein chosen merely for illustrative purposes only. As is well known to those skilled in the art of information storage systems, the exact number of memory addresses is primarily dictated by the required capacity of the memory, whereas the exact number of storage elements in each address is primarily dictated by the maximum word length of the information to be stored therein. As will be seen later, the particular memory plane illustrated in FIG. 1 is adapted to have stored therein a maximum of ten words, each word having a maximum length of three decimal digits. It is also to be appreciated, even though the preferred embodiment of the present invention employs toroidal magnetic cores as data-storage elements, that substantially any of the various well-known coincident-current types of storage elements may be employed with equal success. The various well-known storage elements include ferro-electric types, magnetic thin films, rods, and apertured plates, etc., and the invention also contemplates the use of "twistor" types of storage elements such as those shown and described in co-pending United States patent application Serial No. 696,987, of John R. Anderson et al., filed November 18, 1957, and assigned to the present assignee, now Patent No. 3,042,997, and "bit-wire" types of storage elements such as those shown and described in United States Patent No. 2,945,217, which issued to Robert D. Fisher et al. on July 12, 1960. In accordance with the present invention, it is necessary only that the particular type of data-storage element chosen have two stable states and a responsive-excitation characteristic of a substantially rectangular hysteresis-loop type.

Due to the fact that the illustrated memory plane is adapted to preferably be utilized in a well-known binary-coded-decimal type of information storage system in the manner fully shown and described in co-pending United States patent application Serial No. 859,598, filed December 15, 1959, by Patrick B. Close et al., and assigned to the present assignee, now Patent No. 3,112,394, the twelve rows of cores are effectively divided into three vertical groups, illustrated as #1A through #3A, with four consecutively-ordered core rows making up each group. As will be seen later, the topmost core in each address is utilized to store the low-order bit (hereinafter termed bit "*a*") of the low-order digit of the word stored in that particular address; the cores located in the second row from the top are each utilized to store the second-order bit (bit "*b*") of the first-order digit of the word; the cores located in the third row are each utilized to store the third-order bit (bit "*c*") of the first-order digit; the cores located in the fourth row are each utilized to store the fourth-order bit (bit "*d*") of the first-order digit; the cores located in the fifth row are each utilized to store the first-order bit of the second-order digit; and so on, so that the cores located in the lowermost row of the upper plane are each utilized to store the high-order bit of the high-order digit of the word stored in that particular address.

It is therefore evident that the four adjacent cores of group #1A are collectively utilized to store the low-order digit of the word; the cores of group #2A are collectively utilized to store the second-order digit of the word; and the cores of group #3A are collectively utilized to store the high-order digit of the word. For example, let it be assumed that it is desired to store the three-decimal-digit word 129 in a particular one of the memory addresses. Thus, starting with the topmost core and progressing downwardly in a sequential manner, the cores of groups #1A through #3A of the particular address are magnetically conditioned 1, 0, 0, 0, 0, 1,0, 0, 1, 0, 0, and 1, respectively. When written in a binary-coded-decimal form of notation, the word appears as 0001 0010 1001, the decimal equivalent of which is 129.

In FIG. 2 there is illustrated a second memory plane, which is substantially identical to the one illustrated in FIG. 1, in that there are ten addresses having twelve cores per address, with core groups #1B through #3B adapted to have a three-decimal-digit word stored therein in binary-coded-decimal form. However, the memory plane illustrated in FIG. 2 is different from the memory plane illustrated in FIG. 1 in that the lowermost core in each address is adapted to have stored therein bit "*a*" of the first-order digit (rather than bit "*d*" of the third-order digit, as in FIG. 1), and the top core of each address is adapted to have stored therein bit "*d*" of the third-order digit of the word. Thus, the cores in each of the addresses of the lower memory plane (FIG. 2) are effectively disposed in reverse order with respect to corresponding ones in the upper memory plane (FIG. 1), the reasons for which will become more apparent hereinafter.

In order to simplify the following description, the leftmost address through the rightmost address of both the upper and lower memory planes will hereinafter be designated numerically as addresses "00" through addresses "09," respectively.

As illustrated in combined FIGS. 1 and 2, a plurality of energizing means in the form of single-turn coils 11A through 11J are individually coupled in the same sense to all of the cores disposed in different ones of corresponding addresses of the upper and the lower memory planes; the same sense is herein intended to mean that a current in a given direction through a particular coil tends to magnetically saturate all of the cores linked therewith in the same direction or polarity. In the illustrated embodiment, coil 11A is threaded in the same vertical direction through all of the cores located in address 00 of the upper memory plane, and is also threaded in the same vertical direction through all of the cores located in address 00 of the lower memory plane; coil 11B is threaded in the same vertical direction through all of the cores of address 01 of both memory planes, and so on, so that coil 11J is threaded in the same vertical direction through all the cores of address 09 of both memory planes. The lowermost ends of coils 11A through 11J are individually connected to the cathode electrode of a different one of crystal diodes 12A through 12J, respectively, whose anode electrodes are connected together and returned to address driver 13, whereas the uppermost ends of coils 11A through 11J are individually connected to a different one of address grounders 14A through 14J, respectively.

A second plurality of energizing means in the form of single-turn coils 15A through 15J are also individually coupled in the same sense to all of the cores disposed in different ones of corresponding addresses of both memory planes. In the illustrated embodiment, coil 15A is threaded in the same mentioned vertical direction through all of the cores of address 00 of both memory planes; coil 15B is threaded in the same mentioned vertical direction through all of the cores of address 01 of both memory planes; and so on, so that coil 15J is threaded in the same mentioned vertical direction through all of the cores of address 09 of both memory planes. One end of each of the coils 15A through 15J is respectively connected to the cathode electrode of a different one of crystal diodes 16A through 16J, whose anode electrodes are connected to the anode electrodes of the diodes 12A through 12J, whereas the remaining ends of the coils 15A through 15J are each respectively connected to a different one of address grounders 17A through 17J.

A plurality of energizing means in the form of single-turn coils 18A through 18L are individually coupled in the same sense to all the cores disposed in a different one of the rows of the upper memory plane, and are additionally coupled in an opposite sense to all the cores disposed in a different corresponding one of the rows of the lower memory plane. In the illustrated embodiment, coil 18A is horizontally threaded in one direction through the uppermost row of cores of the upper memory plane, and, additionally, is horizontally threaded in an opposite direction through the lowermost row of cores of the lower memory plane; coil 18B is horizontally threaded in the same mentioned one direction through the second from the topmost row of cores of the upper memory plane, and, additionally, is horizontally threaded in the same mentioned opposite direction through the second from the lowermost row of cores of the lower memory plane; and so on, so that coil 18L is horizontally threaded in the same mentioned one direction through the lowermost row of cores of the upper memory plane, and, additionally, is horizontally threaded in the same mentioned opposite direction through the topmost row of cores of the lower memory plane.

The ends of the coils 18A through 18D extending from core group #1A of address 09 are each connected to the cathode electrode of one of crystal diodes 19A through 19D, respectively, whose anode electrodes are each connected together and returned to first-order-digit driver 20A; the ends of coils 18E through 18H extending from core group #2A of address 09 are each respectively connected to the cathode electrode of a different one of crystal diodes 21A through 21D, whose anode electrodes are each connected together and returned to second-order-digit driver 20B; and the ends of coils 18I through 18L extending from core group #3A of address 09 are each respectively connected to the cathode electrode of a different one of crystal diodes 22A through 22D, whose anode electrodes are each cconnected together and returned to third-order-digit driver 20C. The remaining ends of coils 18A, 18E, and 18I are each connected together and returned to bit "*a*" grounder 23A; the remaining ends of coils 18B, 18F, and 18J are each connected together and returned to bit "*b*" grounder 23B; the remaining ends of coils 18C, 18G, and 18K are each connected together and returned to bit "*c*" grounder 23C; and the remaining ends of coils 18D, 18H, and 18L are each connected together and returned to bit "*d*" grounder 23D.

An additional plurality of coils 24A through 24L are individually threaded in a horizontal direction in the same mentioned one sense through a different one of the rows of cores of the upper memory plane, and, additionally, are individually threaded in the same mentioned opposite sense through a corresponding one of the rows of cores of the lower memory plane. The ends of coils 24A through 24D extending from core group #1B of address 09 of the lower memory plane are each respectively connected to the cathode electrode of a different one of crystal diodes 25A through 25D, whose anode electrodes are each connected together and returned to first-order-digit driver 20A; the ends of coils 24E through 24H extending from core group #2B are each respectively connected to the cathode electrode of a different one of crystal diodes 26A through 26D, whose anode electrodes are each connected together and returned to second-order-digit driver 20B; and the ends of coils 24I through 25L extending from core group #3B are each respectively connected to the cathode electrode of a different one of crystal diodes 27A through 27D, whose anode electrodes are each connected together and returned to third-order-digit driver 20C. The remaining ends of coils 24A, 24E, and 24I are each connected together and returned to bit "*a*" grounder 28A; the remaining ends of coils 24B, 24F, and 24J are each connected together and returned to bit "*b*" grounder 28B; the remaining ends of coils 24C, 24G, and 24K are each connected together and returned to bit "*c*" grounder 28C; and the remaining ends of coils 24D, 24J, and 24L are each connected together and returned to bit "*d*" grounder 28D.

In order to individually sense a reversal of state of the various storage elements selected during a reading operation, a sense winding 29 is provided, which is threaded in the same direction through each of the cores of both memory planes; alternatively, separate sense windings may be employed for each plane, or for each address of each plane, if desired, and may be threaded in alternating senses in a vertical or horizontal direction, if desired.

Due to the fact that the particular construction and mode of operation of the various drivers and grounders are not critical and may be any of the various types well known to those skilled in the art, or as fully shown and described in detail in the aforementioned co-pending United States patent application Serial No. 859,598, a detailed description and illustration thereof are not deemed necessary to be given herein in order that a full and complete understanding and appreciation of the various novel aspects of the present invention may be obtained. Suffice it to say, however, that, when a particular driver and grounder and grounder pair is simultaneously energized by the computer control circuitry, a current of "half-select" magnitude is caused to flow through the particular coil connected therebetween, the magnitude of which half-select current is insufficient to appreciably alter the magnetic state of any one of the various cores coupled thereto, all of which is, again, well known to those skilled in the art.

The mode of operation of the particular memory system disclosed in FIGS. 1 and 2 is as follows: Let it be assumed that it is desired for the word "129" to be stored in binary-coded-decimal code in address 04 of the upper memory plane, bit by bit and digit by digit, starting with the low-order bit ("*a*") of the low-order digit, and ending with the high-order bit ("*d*") of the high-order digit (1) of the word. It is also assumed that both memory planes have previously been cleared in a conventional manner by the writing of all zeros therein; i.e., by magnetically saturating all of the cores in, say, a negative or counter-clockwise direction, as viewed.

To begin the writing operation with respect to the upper memory plane, driver-grounder pair 13–17E is selectively energized and thereby causes a current of half-select magnitude to flow from driver 13 to grounder 17E via diode 16E and coil 15E. Simultaneously therewith, driver-grounder pair 20A–28A is selectively energized and thereby causes a current of "half-select" magnitude to flow from driver 20A to grounder 28A via diode 25A and coil 24A.

Thus, it is seen that the half-select current from driver 13 flows downwardly through the "*a*" bit core of core group #1A of address 04, and, simultaneously therewith, the half-select current from driver 20A flows from left to right through that particular core. Consequently, the magnetomotive forces associated with the two half-select currents is additive in the region of the "a" bit core of group core #1A, and the resultant force is in a direction so as to reverse the direction of saturation of that particular core; all of which results in the "a" bit core thereafter being in a magnetically saturated condition in a clockwise direction, indicative of the binary digit "1" as shown by the direction of the arrow. It is also seen that the half-select current from driver 13 flows downwardly through the "a" bit core of core group #1B of address 04, and, simultaneously therewith, the half-select current from driver 20A flows from right to left through that particular core; consequently, the magnetomotive forces associated with the two half-select currents is subtractive in the region of the "a" bit core of core group #1B. Due to the fact that the resultant magnetomotive force is essentially of zero magnitude, the magnetic condition of the lower plane core is not disturbed during the writing operation with respect to the corresponding upper plane core.

During the next three bit-time periods, none of the driver-grounder pairs is selectively energized, so that the states of the three remaining cores of group #1A of address 04 remain unchanged. Thus, the states of the progressively higher-order cores of group #1A of address 04 are thereafter 1, 0, 0, and 0, respectively, which states collectively represent the decimal digit "1." During the next bit-time period, none of the driver-grounder pairs is selectively energized, so that the state of the "a" bit core of group #2A remains unchanged. However, during the following bit-time period, driver-grounder pairs 13–17E and 20B–28B are simultaneously energized, so that the state of the "b" bit core of group #2A is reversed. During the next two bit-time periods, the states of the remaining cores of group #2A remain unchanged. Thereafter, the states of the progressively higher-order cores of group #2A are 0, 1, 0, and 0, respectively, which states collectively represent the decimal digit "2." During the following four bit-time periods, driver-grounder pairs 13–17E and 20C–28C are simultaneously energized to effect reversal of the state of the "a" bit core of group #3A, and driver-grounder pairs 13–17E and 20C–28D are simultaneously energized to effect reversal of state of the "d" bit core of group #3A. Following the just-described writing cycle, the progressively higher-order cores of group #3A are magnetically conditioned 1, 0, 0, and 1, respectively, representative of the decimal digit "9."

It is therefore seen that the progressively higher-order cores of address 04 of the upper memory plane are sequentially conditioned, one after the other, to collectively represent the word "129" simply by effecting selective energization of drivers 13 and 20A through 20C, coincidentally with selected ones of grounders 17E and 28A through 28D.

Suppose that it had initially been desired for the word "129" to be stored in lower memory address 04 instead of upper memory address 04, as just described. In this instance, driver-grounder pair 13–17E is selectively energized, as before, to cause a half-select drive current to flow downwardly through the cores of address 04. However, in this instance, driver-grounder pair 20A–23A is selectively energized simultaneously therewith to cause a half-select drive current to flow from left to right through the lowermost row of cores of the lower memory plane, rather than driver-grounder pair 20A–28A, as in the previous example. Thereafter, the cores of lower address 04 are magnetically conditioned in essentially the same manner as just described, one after the other in sequential order, starting with the lowermost core and ending with the uppermost core thereof.

In summary, in order to perform a writing operation with respect to upper memory address 04, driver-grounder pair 13–17E is selectively energized simultaneously with selected ones of the driver-grounder pairs taken from driver group 20A–20C and grounder group 28A–28D; however, to perform a writing operation with respect to lower memory address 04, driver-grounder pair 13–17E is selectively energized simultaneously with selected ones of driver-grounder pairs taken from driver group 20A–20C and grounder group 23A–23D.

As is well known in the art, in order to perform a reading operation, all of the magnetic elements to be read out are sequentially reset to zero, and if during the process of being reset to zero the magnetic state of a particular element is reversed, an electrical impulse is induced in the sense winding coupled to that particular element, indicating that that particular element was initially storing a binary "1." Therefore, in order to perform a reading operation with respect to upper memory address 04, driver-grounder pair 13–14E is selectively energized simultaneously with selected ones of driver-grounder pairs taken from driver group 20A–20C and grounder group 23A–23D, and, to perform a reading operation with respect to lower memory address 04, driver-grounder pair 13–14E is selectively energized simultaneously with selected ones of driver-grounder pairs taken from driver group 20A–20C and grounder group 28A–28D.

It is therefore evident that grounder group 14A–14J is selectively utilized for performing a writing operation with respect to the lower memory addresses, and for performing a reading operation with respect to the upper memory address; grounder group 28A–28D is selectively utilized for performing a writing operation with respect to the upper core rows, and for performing a reading operation with respect to the lower core rows; grounder group 23A–23D is selectively utilized for performing a reading operation with respect to the upper core rows, and for performing a writing operation with respect to the lower core rows; and grounder group 17A–17J is selectively utilized for performing a writing operation with respect to the upper memory addresses, and for performing a reading operation with respect to the lower memory addresses. Driver 13 is selectively utilized during both a reading and a writing operation with respect to the addresses of both memory planes, whereas driver group 20A–20D is selectively utilized during both a reading and a writing operation with respect to the core rows of both memory planes.

Thus, in accordance with the present invention, there has been devised a novel biplanar memory system which automatically inhibits operation of one memory plane when a read-write operation is initiated with respect to the remaining memory plane, which does not necessitate any type of inhibit control or stringent timing requirements with respect to the accompanying drive selection circuitry, which may be economically fabricated, and which is capable of utilizing any of the various storage elements from the group including ferro-electrics, magnetic thin films, apertured plates, rods, toroidal cores, twistors, bit wires, and the like.

While a particular embodiment of the present invention has been shown and described, it will be obvious to those skilled in the art of information storage devices that changes and modifications may be made without departing from the invention in its broader aspects, and, therefore, the aim in the appended claims is to cover all such changes and modifications as fall within the true spirit and scope of the invention.

What is claimed is:

1. A magnetic memory system comprising: a first and a second memory plane each having a plurality of magnetic data-storage elements arranged in a plurality of columns and rows; a plurality of column coils, a different one of which is coupled in one sense to all the elements in a different one of said columns of said first memory plane and is coupled in the same sense to all the elements in a corresponding one of said columns of said second memory plane; a plurality of row coils, a different one of which is coupled in one sense to all the elements in a different one of said rows of said first memory plane and is coupled in an opposite sense to all the elements in a corresponding one of said rows of said second memory plane; and means for effecting coincidental energization of a selected row and column coil.

2. A magnetic memory system comprising: a first and a second memory plane having a plurality of magnetic cores arranged in a plurality of columns and rows; a plurality of column coils, a different one of which is threaded in one sense through all the cores of a different one of said columns of said first memory plane and is threaded in the same sense through all of the cores in a corresponding one of said columns of said second memory plane; a plurality of row coils, a different one of which is threaded in one sense through all the cores in a different one of said rows of said first memory plane and is threaded in an opposite sense through all the cores in a corresponding one of said rows of said second memory plane; and means for effecting coincidental energization of a selected row and column coil.

3. An information storage device comprising: a first and a second group of storage elements, each group of elements being arranged in a plurality of rows and columns, and each element having two stable states and a response-excitation characteristic of a substantially rectangular hysteresis-loop type; a plurality of energizing means, a different one of which is coupled to all the storage elements in a different one of corresponding columns of both said first and second groups, and operative to partially effect a change of state in one direction of said columnar elements; and a plurality of reversibly-operable energizing means, a different one of which is coupled to all the storage elements in a different one of the rows of said first group and operative in one direction to partially effect a change of state in one direction of said row of elements of said first group, and is additionally oppositely coupled to all the storage elements in a corresponding one of the rows of said second group and operative in the opposite direction to partially effect a change of state in the opposite direction of said row of elements of said second group.

4. A coincident current magnetic memory system comprising: a first and a second memory array, each array having a plurality of magnetic data-storage elements arranged in a plurality of columns and rows; a plurality of column coils, each of said column coils having a pair of parallel-connected read-write sections, one read-write section of each pair being coupled in one sense to all the storage elements of a different one of corresponding columns of both of said arrays, and the other read-write section of each pair being coupled in an opposite sense to all the storage elements of the same column of each of said arrays as the corresponding read-write section; a plurality of row coils, each of said row coils having a pair of parallel-connected read-write sections, one read-write section of each pair being coupled in said one sense to all the storage elements in a different one of said rows of said first memory array, and being additionally coupled in said opposite sense to all the storage elements in a corresponding one of said rows of said second memory array, and the other read-write section of each pair being coupled in said opposite sense to all the storage elements in the same row of said first memory array as the corresponding read-write section, and being additionally coupled in said one sense to all the storage elements in the same row of said second memory array as the corresponding read-write section; means for selectively applying a half-select current to the read-write sections of a selected column coil and to the read-write sections of a selected row coil; and means for selectively rendering effective a selected section of a selected column coil coincidentally with a selected section of a selected row coil.

5. A coincident current magnetic memory system comprising: a first and a second memory array, each array having a plurality of magnetic cores arranged in a plurality of columns and rows; a plurality of column coils, each of said column coils having a pair of parallel-connected read-write sections, one read-write section of each pair being threaded in one sense through all the cores of a different one of corresponding columns of both of said arrays, and the other read-write section of each pair being threaded in an opposite sense through all the cores of the same column of each of said arrays as the corresponding read-write section; a plurality of row coils, each of said row coils having a pair of parallel-connected read-write sections, one read-write section of each pair being threaded in said one sense through all the cores in a different one of said rows of said first memory array and being additionally threaded in said opposite sense through all the cores in a corresponding one of said rows of said second memory array, and the other read-write section of each pair being threaded in said opposite sense through all the cores of the same row of said first memory array as the corresponding read-write section and being additionally threaded in said one sense through all the cores in the same row of said second memory array as the corresponding read-write section; means for selectively applying a half-select current to the read-write sections of a selected column coil and to the read-write sections of a selected row coil; and means for selectively rendering effective a selected section of said selected column coil coincidentally with a selected section of said selected row coil.

References Cited in the file of this patent

UNITED STATES PATENTS

| | | |
|---|---|---|
| 2,897,482 | Rosenberg | July 28, 1959 |
| 2,920,315 | Markowitz | Jan. 5, 1960 |
| 2,979,701 | Marchand | Apr. 11, 1961 |
| 2,983,828 | Samuel | May 9, 1961 |

UNITED STATES PATENT OFFICE

CERTIFICATE OF CORRECTION

Patent No. 3,146,428 August 25, 1964

John C. F. Walker III

It is hereby certified that error appears in the above numbered patent requiring correction and that the said Letters Patent should read as corrected below.

Column 3, line 24, for "consitute" read -- constitute --; column 5, line 59, for "cconnected" read -- connected --; column 7, line 43, for "20C-28C" read -- 20C-28A --.

Signed and sealed this 22nd day of December 1964.

(SEAL)
Attest:

ERNEST W. SWIDER
Attesting Officer

EDWARD J. BRENNER
Commissioner of Patents